US010275334B1

(12) United States Patent
Lininger et al.

(10) Patent No.: US 10,275,334 B1
(45) Date of Patent: Apr. 30, 2019

(54) BEGINNER-FRIENDLY SYSTEM FOR IDENTIFYING BUGS IN COMPUTER CODE

(71) Applicant: Codepops Inc., Boulder, CO (US)

(72) Inventors: Scott Lininger, Lafayette, CO (US); Jeffrey Bull, Westminster, CO (US)

(73) Assignee: Codepops Inc., Boulder, CO (US)

( * ) Notice: Subject to any disclaimer, the term of this patent is extended or adjusted under 35 U.S.C. 154(b) by 0 days.

(21) Appl. No.: 15/828,103

(22) Filed: Nov. 30, 2017

Related U.S. Application Data

(60) Provisional application No. 62/455,020, filed on Feb. 6, 2017.

(51) Int. Cl.
| G06F 9/44 | (2018.01) |
|---|---|
| G06F 11/36 | (2006.01) |
| G06F 8/41 | (2018.01) |
| G06F 11/07 | (2006.01) |

(52) U.S. Cl.
CPC .......... *G06F 11/3604* (2013.01); *G06F 8/427* (2013.01); *G06F 8/436* (2013.01); *G06F 11/0769* (2013.01); *G06F 11/0775* (2013.01); *G06F 11/0787* (2013.01); *G06F 11/3624* (2013.01); *G06F 11/3692* (2013.01)

(58) Field of Classification Search
CPC .................................................... G06F 11/3604
USPC ................................................. 717/130–135
See application file for complete search history.

(56) References Cited

U.S. PATENT DOCUMENTS

| 5,822,589 | A | * | 10/1998 | Diamant | G06F 11/3604 717/131 |
|---|---|---|---|---|---|
| 5,857,070 | A | * | 1/1999 | Satterfield | G06F 11/3604 714/38.13 |
| 6,978,440 | B1 | * | 12/2005 | Pavela | G06F 11/3664 714/E11.208 |
| 7,003,765 | B1 | * | 2/2006 | Venkatasubramanian | G06F 8/42 714/E11.207 |
| 7,110,936 | B2 | * | 9/2006 | Hiew | G06F 8/34 703/22 |
| 7,140,004 | B1 | * | 11/2006 | Kunins | G06F 8/20 717/125 |
| 7,181,729 | B2 | * | 2/2007 | Grundy | G06F 11/3608 714/E11.207 |
| 7,549,144 | B2 | * | 6/2009 | Jubran | G06F 8/20 717/124 |
| 7,779,399 | B2 | * | 8/2010 | Huang | G06F 21/54 717/131 |
| 8,732,673 | B2 | * | 5/2014 | Finking | G06F 11/3624 717/126 |

(Continued)

OTHER PUBLICATIONS

Carreira et al,"Scalable Testing of File System Checkers", ACM, pp. 239-251. 2012 (Year: 2012).*

(Continued)

*Primary Examiner* — Anil Khatri
(74) *Attorney, Agent, or Firm* — Rowan Tels LLC

(57) ABSTRACT

A system for identifying and describing programming errors passes source code through a syntax checker, operates a parser to identify potential problems in the source code, assembles a structured problem list of identified potential problems, operates an interpreter to execute the source code and match execution errors to an identified potential problem in the structured problem list, and generates an error report for novice programmers to understand.

18 Claims, 6 Drawing Sheets

(56) References Cited

U.S. PATENT DOCUMENTS

| | | | | |
|---|---|---|---|---|
| 8,745,593 | B2* | 6/2014 | Remollino | G06F 11/3624 |
| | | | | 717/125 |
| 9,015,831 | B2* | 4/2015 | Scott | G06F 11/3604 |
| | | | | 726/22 |
| 9,201,757 | B2* | 12/2015 | Menghrajani | G06F 8/437 |
| 9,207,921 | B2* | 12/2015 | Song | G06F 8/443 |
| 9,274,770 | B2* | 3/2016 | Song | G06F 11/3624 |
| 10,108,802 | B2* | 10/2018 | Lu | G06F 21/577 |

OTHER PUBLICATIONS

Kondoh et al, "Finding Bugs in Java Native Interface Programs", ACM, pp. 109-117, 2008 (Year: 2008).*

Mederios et al, "Syntax Error Recovery in Parsing Expression Grammars", ACM, pp. 11-95-1202, 2018 (Year: 2018).*

Jonge et al, "Natural and Flexible Error Recovery for Generated Modular Language Environments", ACM Transactions on Programming Languages and Systems, vol. 34, No. 4, Article 15, pp. 1-50, 2012 (Year: 2012).*

Kuramitsu, "A Symbol-Based Extension of Parsing Expression Grammars and Context-Sensitive Packrat Parsing", ACM, pp. 26-37, 2017 (Year: 2017).*

Prost, "Grammar Error Detection with Best Approximated Parse", ACM, pp. 172-175, 2009 (Year: 2009).*

\* cited by examiner

US 10,275,334 B1

BEGINNER-FRIENDLY SYSTEM FOR IDENTIFYING BUGS IN COMPUTER CODE

CROSS-REFERENCE TO RELATED APPLICATIONS

This application claims benefit under 35 U.S.C. 119 to U.S. application Ser. No. 62/455,020, entitled "A BEGINNER-FRIENDLY SYSTEM FOR IDENTIFYING BUGS IN COMPUTER CODE", filed on Feb. 6, 2017, and incorporated herein by reference in its entirety.

BACKGROUND

Programs written in interpreted programming languages (e.g., JAVASCRIPT, PYTHON, RUBY, PERL, PHP, etc.) are executed without being compiled into machine language by using an interpreter. Errors detected by the interpreter are presented to the programmer with terminology describing potential issues. To a novice programmer, many of these error messages may be difficult to understand and may obfuscate potential solutions for correcting the program.

BRIEF SUMMARY

Disclosed herein are embodiments of a system that identifies bugs in computer code being written by beginning programmers, and provides help feedback to the programmers that is easy for beginners to understand. The system both better identifies program bugs, and explains the bugs in simple terms. For example, instead of a confusing error such as "Syntax Error: Unidentified token", the system may report "Whoops! You forgot the parenthesis at the end of line 6." The end result is a system in which program bugs are easier for beginners to understand and fix.

The system may monitor programming errors across a large body of users, to continually improve the algorithms. The system may monitor millions of lines of code and the errors they produce, essentially "crowdsourcing" a huge corpus of common beginner mistakes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
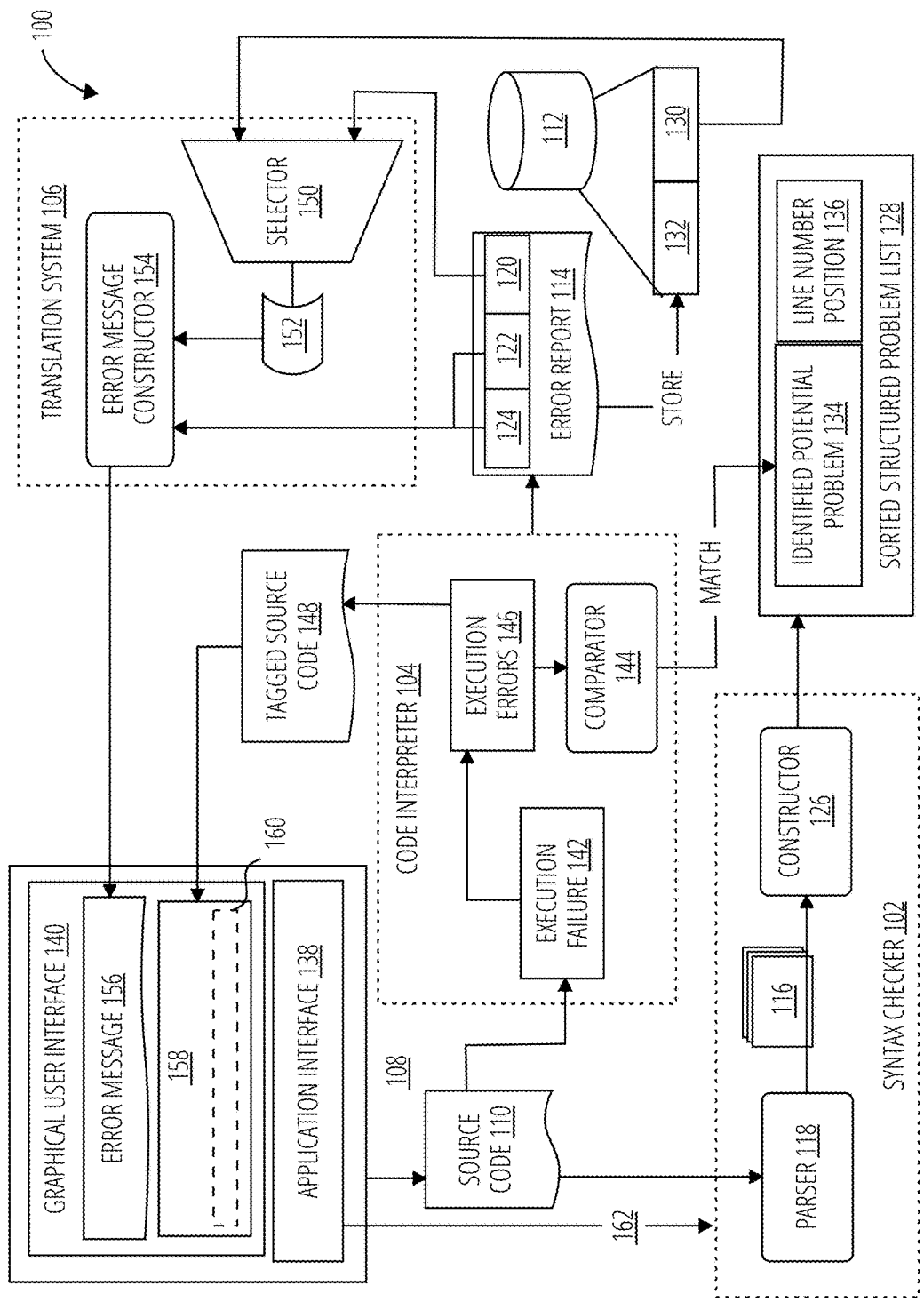
FIG. 1 illustrates an embodiment of a system for identifying and describing programming errors 100.

In one embodiment, a system is disclosed comprising a syntax checker, a code interpreter, and a translation system. The syntax checker identifies potential problems in computer code written by the programmer. The interpreter verifies which (if any) of the problems actually exist versus false positives. The translation system translates errors generated by one or more of the computer code compiler, linker, or interpreter into a more human-readable and understandable form.

In some embodiments, the system may generate a simplified error message describing a potential solution such as specifying the correct variable name for a "ReferenceError", providing the correct special character to use for an "UnexpectedToken" error, and listing the reported function "this is not a function" error while providing the line number location of the error and a visual indicator in the source code at the line number position to facilitate identification. For example, if an "UnexpectedToken" error is detected, the system may display the following message "On line 6, did you forgot to put a curly bracket '}' at the end of your function?" and highlight the line in question to point the user at a solution.

In overview, a process to improve error reporting for computer code may proceed as follows:

I. The user enters several lines of computer code and attempts to "run" them.

II. The syntax checker analyzes the computer code and builds a list of potential problems. There are often dozens of small syntax problems that novice coders introduce as they are learning, but not all of these prevent the code from running successfully.

III. Each of the potential problems found is coded into a data structure according the line number in the computer code of the potential error.

IV. The interpreter executes the computer code. If the computer code successfully executes, then the system does not generate any syntax problems. But if the computer code fails to execute, the system generates a data structure comprising the error, the error code, and (when possible) the line number in the computer code where the error manifests.

V. The translation system converts the error and/or error code into a simplified and more understandable error message. Often, an error from step IV manifests in the interpreter on a different line of the computer code from the syntax problem that manifested from the syntax checker in step III.

The challenge is to identify the most important error out of many errors that might be generated, and to focus the translation on that key error. By monitoring, recording, and categorizing thousands of users coding thousands of "simple" computer programs, the system identifies the most common errors, and prioritizes error messages for those. The algorithm below reflects this underlying pattern.

1. If the interpreter error is a "ReferenceError", that means it's about a specifically named variable. Record that variable name to be used in step 3.

2. If the interpreter error is a "UnexpectedToken", that means they put in the wrong special character at some point. Record that character to be used in step 3.

3. If the interpreter error is "this is not a function", that means they incorrectly called a function. Either the function doesn't exist (often they misspelled it) or they didn't finish coding the function. Either way, record the reported function name to be used in step 3.

4. Loop across all of the syntax warnings from Step II above to identify the code line where the problem mostly likely exists.

5. If the syntax warning matches either the ReferenceError variable, UnexpectedToken character, or nonexistent function from steps 1-3 above, mark that line as the most likely source of the bug.

6. If none of the syntax warnings match, check to see if the raw interpreter error reported a specific line number. If so, record that line as the most likely source of the bug.

7. If there is no specific line from the interpreter error (there often is not), the first line is taken with any problem recorded in the syntax check from step II, as the earliest syntax problem is likely to be the root cause of later errors.

8. There is a common case where the raw error is an "Unexpected end of input". In such a case, record the last line of the code as the problem.

With the most likely line number of the error, there is one additional use case to handle. Often there are multiple syntax problems on the same line, so just knowing the line number isn't good enough to provide a nice, actionable error message. Based on aggregated data, the last syntax warning on the line is the most likely to be the source of the trouble.

With best errors identified to display, a final step is to look into a database of error messages with recorded use cases and reports. For each error messages, a useful description is provided, such as "On line 6, did you forgot to put a curly bracket '}' at the end of your function?" while highlighting the line in question to point the user at a solution.

Referencing FIG. 1, a system for identifying and describing programming errors 100 comprises a syntax checker 102, a code interpreter 104, a translation system 106, and a user device 108.

The user device 108 comprises a graphical user interface 140 and an application interface 138. The syntax checker 102 receives a source code 110 comprising at least one line of executable code following detection of an execution control through the application interface 138. The graphical user interface 140 displays an error message 156 and a source code 158 comprising a visual indicator 160 for the line number position corresponding to the error message 156 generated from a tagged source code 148. The error message 156, the source code 158, and the visual indicator 160 may be an error file, such as a file or files, that comprises instruction to operate a machine that has received the file or files to display the error message 156, the source code 158, and the visual indicator 160 on a machine display, such as the graphical user interface 140.

The syntax checker 102 comprises a parser 118 and a constructor 126. The constructor 126 assembles a sorted structured problem list 128 from the identified potential problems and line number positions 116 identified by the parser 118.

The code interpreter 104 may detect an execution failure 142 after executing the source code 110. The code interpreter 104 identifies an execution errors 146 for the execution failure 142. A comparator 144 matches the execution errors 146 to an identified potential problem 134 with a corresponding line number position 136. The code interpreter 104 generates an error report 114 comprising a line number position 124, an identified potential problem 122, and an execution errors 120. The error report 114 is stored in an error report allocation of memory 132 of a controlled memory data structure 112.

The translation system 106 comprises an error message constructor 154 and a selector 150. The execution errors 120 configures the selector 150 to select an error message descriptor 152 from an error message allocation of memory 130 in the controlled memory data structure 112. The error message constructor 154 assembles the error message 156 comprising the error message descriptor 152, the line number position 124, and the identified potential problem 122.

Figure 2:
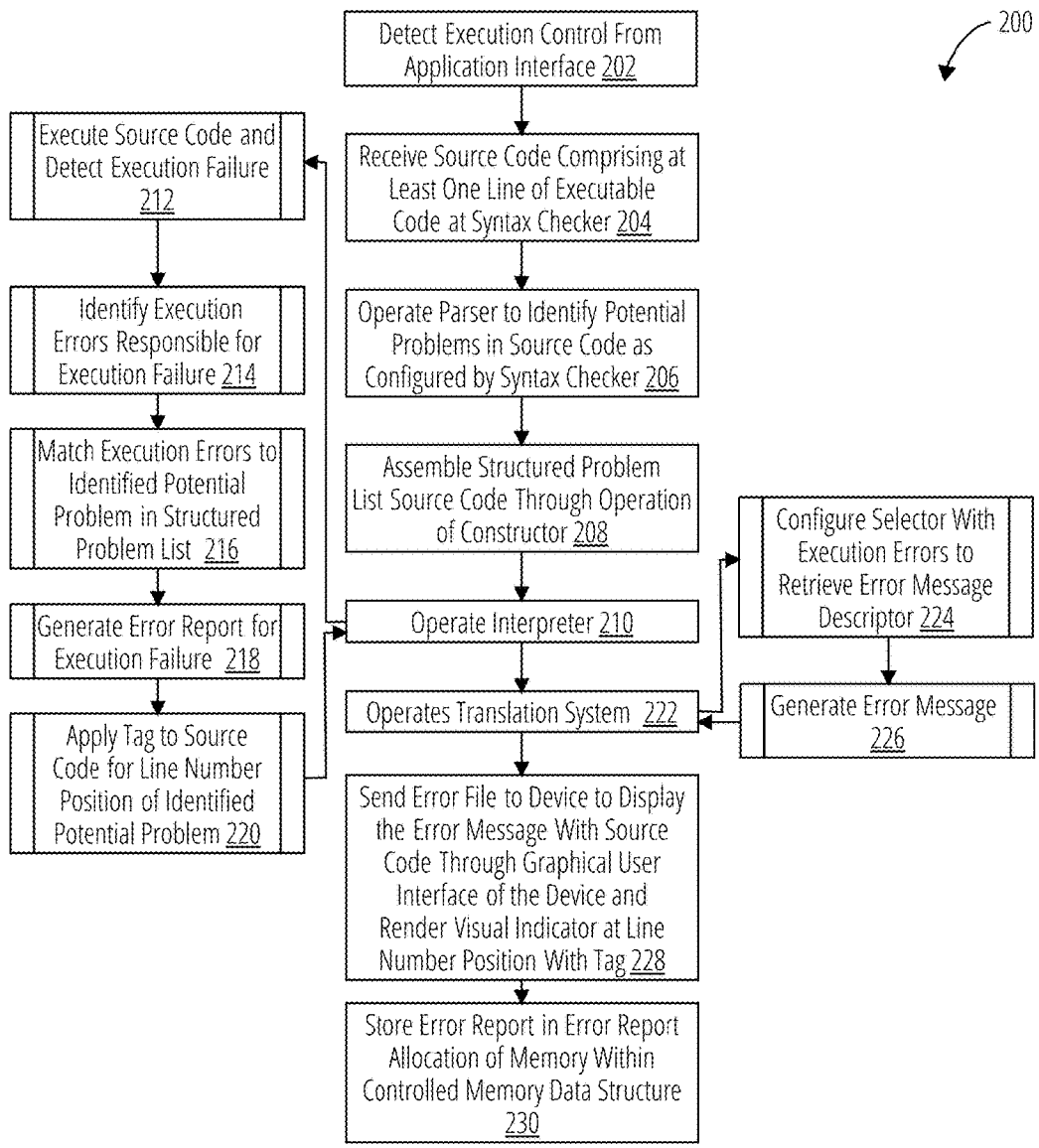
FIG. 2 illustrates an embodiment of a process of operating a system for identifying and describing programming errors 200.
Figure 3:
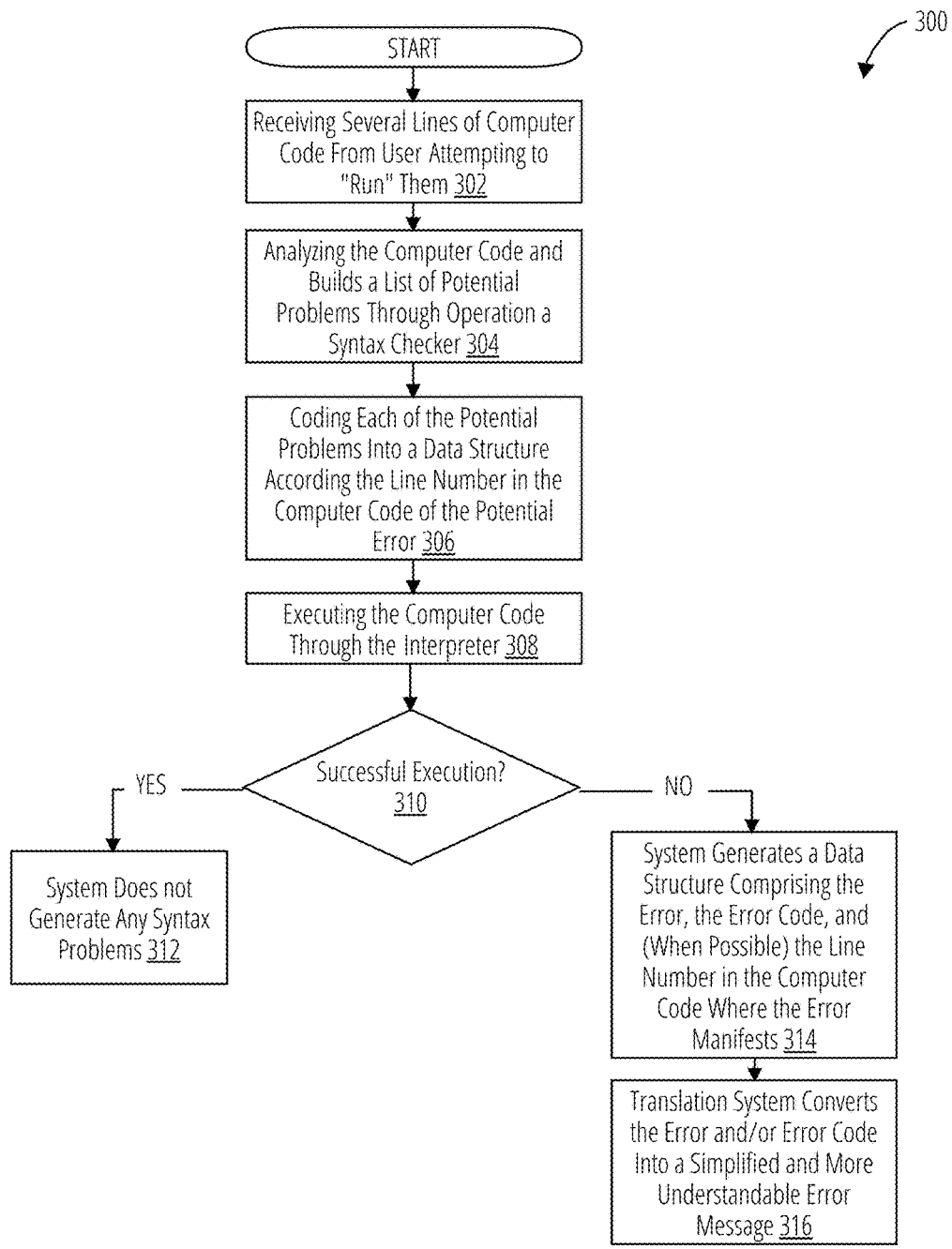
FIG. 3 illustrates an embodiment of a process of operating a system for identifying and describing programming errors 300.
Figure 4:
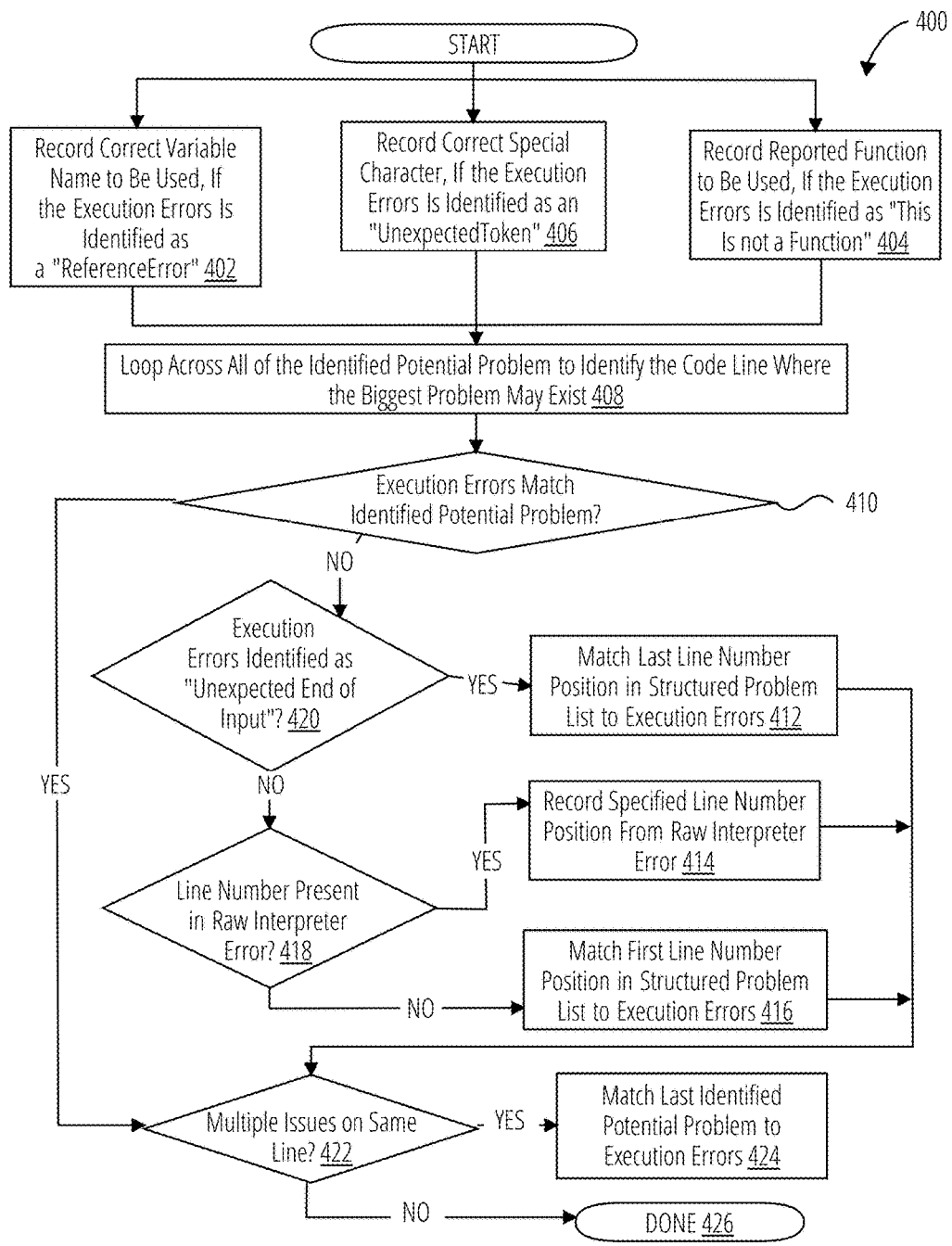
FIG. 4 illustrates an embodiment of a process of operating a system for identifying and describing programming errors 400.
Figure 5:
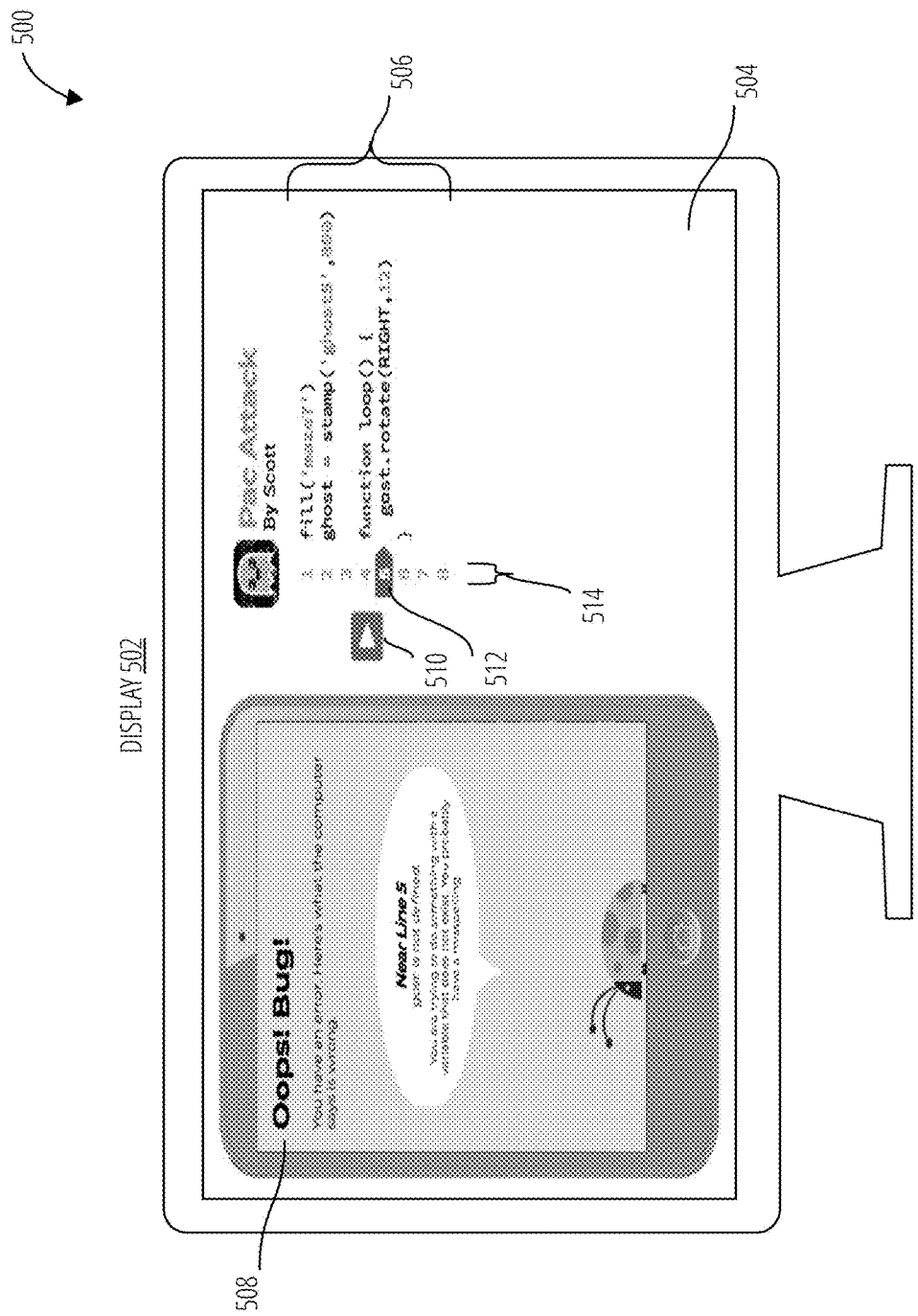
FIG. 5 illustrates a device display under influence of error file 500 in accordance with one embodiment.

The system for identifying and describing programming errors 100 may be operated in accordance with the process described in FIG. 2, FIG. 3, and FIG. 4.

Referencing FIG. 2, a process of operating a system for identifying and describing programming errors 200 detects an execution control from an application interface (block 202). The process of operating a system for identifying and describing programming errors 200 receives a source code comprising at least one line of executable code at a syntax checker (block 204). The process of operating a system for identifying and describing programming errors 200 operates a parser to identify potential problems in the source code as configured by the syntax checker (block 206). A constructor assembles a structured problem list comprising identified potential problems sorted according to line number position of each identified potential problem in the source code (block 208). The process of operating a system for identifying and describing programming errors 200 operates an interpreter (block 210). The interpreter executes the source code and detects execution failure (subroutine block 212). The interpreter identifies execution errors responsible for the execution failure (subroutine block 214). The interpreter controls a comparator to match the execution errors to an identified potential problem in the structured problem list (subroutine block 216). The interpreter generates an error report for the execution failure comprising the identified potential problem, the execution errors, and the line number position for the identified potential problem within the source code (subroutine block 218). The interpreter applies a tag to the source code for the line number position of the identified potential problem (subroutine block 220). The process of operating a system for identifying and describing programming errors 200 operates a translation system (block 222). The translation system configures a selector with the execution errors to retrieve an error message descriptor from an error message allocation of memory in a controlled memory data structure (subroutine block 224). The common errors are identified from the error reports in the error message allocation of memory within the controlled memory data structure. Each of the common errors are associated with one or more resultant errors and a specific error message descriptor. Machine learning may be utilized to determine that an error is one of the common errors or one of the resultant errors. The system may determine probabilities that a specific one of the resultant errors is due to a specific one of the common errors. The system may further determine probabilities based on have multiple resultant errors. Then each of the execution errors is determined to be one of the common errors or one of the one or more resultant errors. The probabilities may be utilized to determine whether the error is one of the common errors or one of the resultant errors. For each one of the one or more resultant errors determined, one of the common errors associated with for the execution errors is selected. As each of the resultant errors may be associated with one of the common errors, the method may select the most likely common error based on the probabilities determined previous. Additional resultant errors may alter the likelihood of a specific common error being present. The error message descriptor is generated from the specific error message descriptor of each of the common errors determined or selected for the execution errors. Each common error determined to be present or selected based on the presence of one or more resultant errors has an associated specific error message descriptor. The specific error message descriptor of each of the common errors is combined to generate the error message descriptor. The specific error message descriptor for multiple instances of the same common error may be utilized once in the error message descriptor. The translation system generates an error message comprising the error message descriptor with the identified potential problem and the line number position through control of an error message constructor (subroutine block 226). The process of operating a system for identifying and describing programming errors 200 sends an error file to a device to display the error message with source code through a graphical user interface of the device and render the visual indicator at the line number position with the tag (block 228). The error file may comprise one or more files to be executed by the device. The device may be the device that generated the execution control from an application interface associated with that device. The process of operating a system for identifying and describing programming errors 200 stores the error report in an error report allocation of memory within the controlled memory data structure (block 230).

Referencing FIG. 3, a process of operating a system for identifying and describing programming errors 300 receives several lines of computer code from a user attempting to "run" them (block 302). The process of operating a system for identifying and describing programming errors 300 analyzes the computer code and builds a list of potential problems through operation a syntax checker (block 304). The process of operating a system for identifying and describing programming errors 300 codes each of the potential problems into a data structure according the line number in the computer code of the potential error (block 306). The process of operating a system for identifying and describing programming errors 300 executes the computer code through the interpreter (block 308) and determines if the execution was successful (decision block 310). If the execution was successful, the system does not generate any syntax problems (block 312). Else, if the systems was not successful, the system generates a data structure comprising the error, the error code, and (when possible) the line number in the computer code where the error manifests (block 314) and the translation system converts the error and/or error code into a simplified and more understandable error message (block 316).

Referencing FIG. 4, a process of operating a system for identifying and describing programming errors 400 records correct variable name to be used, if the execution errors is identified as a "ReferenceError" (block 402). The process of operating a system for identifying and describing programming errors 400 records reported function to be used, if the execution errors is identified as "this is not a function" (block 404). The process of operating a system for identifying and describing programming errors 400 records correct special character, if the execution errors is identified as an "UnexpectedToken" (block 406). The process of operating a system for identifying and describing programming errors 400 loop across all of the identified potential problem to identify the code line where the biggest problem may exists (block 408).

In decision block 410, the process of operating a system for identifying and describing programming errors 400 determines whether the execution errors matches the identified potential problem. If the execution errors matches identified potential problems, the process moves to decision block 422 to determine if there are multiple issues on the same line. Else, if the execution errors does not match the identified potential problems, the process of operating a system for identifying and describing programming errors 400 determines whether the execution errors is identified as an "Unexpected end of input" error (decision block 420).

If the process identifies the execution errors as an "Unexpected end of input" error, the process matches last line number position in the structured problem list to the execution errors (block 412). Else, the process determines whether a specified line number position is present in the raw interpreter error (decision block 418).

If the process determines the specified line number position for the execution errors is present, the process records the specified line number position from the raw interpreter error (block 414). Else, if the process determines the specified line number position is not present in the raw interpreter error, the process matches the first line number position in the structured problem list to the execution errors (block 416).

After identifying potential matches for the execution errors, the process of operating a system for identifying and describing programming errors 400 determines whether there are multiple issues on the same line (decision block 422). If the process determines that there are multiple issues on the same line, the process matches the last identified potential problem to the execution errors (block 424). Else, if the process determines that there are not multiple issues on the same line, the process ends (done block 426).

The device display under influence of error file 500 comprises a display 502, a graphical user interface 504, a source code 506, an error message 508, a visual indicator 510, a tag 512, and line number positions 514.

The display 502 displays the graphical user interface 504 in response to a device associated with the display 502 receiving an error file. The source code 506 is displayed with the line number positions 514 depicting the line number of each line of the source code 506 and the tag 512 indicating the line number position with the execution errors. The error message 508 comprises information associated with the execution errors and suggested actions for a user viewing the display 502. The visual indicator 510 is rendered to associate the error message 508 and the tag 512.

Figure 6:
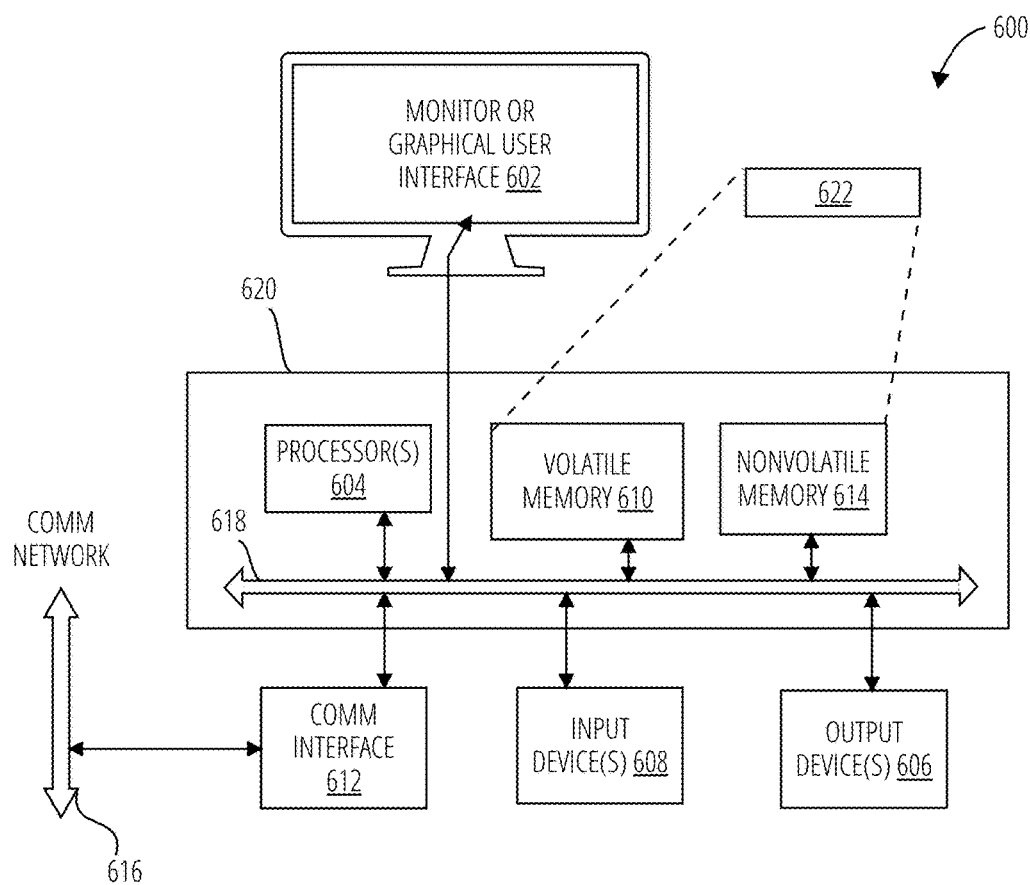
FIG. 6 is an example block diagram of a computing device 600 that may incorporate embodiments of the present invention.

FIG. 6 is an example block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 620, a communication network interface 612, input device(s) 608, output device(s) 606, and the like.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include the monitor or graphical user interface 602, speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FIREWIRE, USB, a wireless communication interface such as BLUETOOTH or WI-FI, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said logic 622 may be read from the volatile memory 610 and/or nonvolatile memory 614 and executed by the processor(s) 604. The volatile memory 610 and the nonvolatile memory 614 may also provide a repository for storing data used by the logic 622.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files.

The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Various logic operations described herein may be implemented in logic that is referred to using a noun or noun phrase reflecting said operation. For example, an association operation may be carried out by an "associator" or "correlator". Likewise, switching may be carried out by a "switch", selection by a "selector", and so on.

"Associator" in this context refers to a correlator (see the definition for Correlator).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low-_alarm_condition |low_threshold_value|0||safe_condition |safe_lower_bound |safe_upper_bound||high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" in this context refers to a logic element that selects one of two or more inputs to its output as determined by one or more selection controls. Examples of hardware selectors are multiplexers and demultiplexers. An example software or firmware selector is: if (selection control==true) output=input1; else output=input2; Many other examples of selectors will be evident to those of skill in the art, without undo experimentation.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Software" in this context refers to logic implemented as processor-executable instructions in a machine memory (e.g. read/write volatile or nonvolatile memory or media).

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection)==true and selection2==true) output=input1; else if (selection1==true and selection2==false) output=input2; else if (selection1==false and selection2==true) output=input3; else output=noOp; Switches operate similarly to selectors in many ways (see the definition of selector), except in some cases switches may select all inputs to the output,(s) not select among inputs. Other examples of switches will be readily apparent to those having skill in the art, without undo experimentation.

"Application interface" in this context refers to a device or program enabling a user to communicate with a computer, a program, or piece of software designed and written to fulfill a particular purpose of the user.

"At least one line" in this context refers to a row of symbols and/or characters.

"Common errors" in this context refers to an execution error that cause other execution errors or a set of characters, symbols, etc., in source code that may cause another part or line of the source code to have an execution error. An example of the latter may be a defined variable where the source code has utilized different characters, symbols, etc., from the defined variable in later instances, but the same in each of those instances.

"Control (or control signal)" in this context refers to a pulse or frequency of electricity or light that represents a control command as it travels over a network, a computer channel or wireless.

"Executable code" in this context refers to program instructions to cause a computer to perform indicated tasks according to encoded instructions.

"Graphical user interface" in this context refers to a type of user interface that allows users to interact with electronic devices through graphical icons and visual indicators such as secondary notation.

"One or more resultant errors" in this context refers to execution error caused by (or likely to be caused by) a common error.

"Potential problems" in this context refers to presence or absence of characters, symbols, etc., in source code, which may cause the code to not execute when directed.

"Source code" in this context refers to any collection of computer instructions, possibly with comments, written using a human-readable programming language, usually as plain text.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. A method comprising:
receiving a source code comprising at least one line of executable code at a syntax checker in response to detecting an execution control from an application interface;
operating a parser to identify potential problems in the source code as configured by the syntax checker, wherein the potential problems in the source code include at least one of presence of characters, absence of characters, presence of a symbol, absence of a symbol, and combinations thereof;
assembling a structured problem list comprising identified potential problems sorted according to line number position of each of the identified potential problems in the source code through operation of a constructor;
operating an interpreter to:
execute the source code and detect an execution failure; identify execution errors responsible for the execution failure; match the execution errors to the identified potential problems in the structured problem list through control of a comparator;
generate an error report for the execution failure comprising the identified potential problems, the execution errors, and the line number position for the identified potential problems within the source code; and
apply a tag to the source code for the line number position of the identified potential problems;
operating a translation system to:
configure a selector with the execution errors to retrieve an error message descriptor from an error message allocation of memory in a controlled memory data structure comprising error reports from one or more source codes by:
identifying common errors from the error reports in the error message allocation of memory within the controlled memory data structure,
each of the common errors associated with one or more resultant errors and a specific error message descriptor;
determining each of the execution errors to be one of the common errors or one of the one or more resultant errors;
selecting one of the common errors associated with each one of the one or more resultant errors determined for the execution errors; and
generating the error message descriptor from the specific error message descriptor of each of the common errors determined or selected for the execution errors;
generate an error message comprising the error message descriptor with the identified potential problems and the line number position through control of an error message constructor; and
sending an error file to a device to display the error message with the source code through a graphical user interface and render a visual indicator at the line number position with the tag; and
storing the error report in an error report allocation of memory within the controlled memory data structure;
parse a raw interpreter error for the execution failure to identify the execution errors.

2. The method of claim 1, further comprising:
recording a correct variable name to be used, if the execution errors is identified as a "Reference Error";
recording a correct special character, if the execution errors is identified as an "UnexpectedToken"; and
recording a reported function to be used, if the execution errors is identified as "this is not a function".

3. The method of claim 2, further comprising:
recording a specified line number position from the raw interpreter error, if the comparator fails to match the execution errors to the identified potential problems.

4. The method of claim 3, further comprising:
matching a first line number position in the structured problem list to the execution errors, if the specified line number position is not present in the raw interpreter error.

5. The method of claim 2, further comprising:
matching a last line number position in the structured problem list to the execution errors, if the execution errors is identified as an "Unexpected end of input".

6. The method of claim 2, further comprising:
matching a last identified potential problem to the execution errors, if two or more of the identified potential problems have a same line number position.

7. A non-transitory computer-readable storage medium, the computer-readable storage medium including instructions that when executed by a computer, cause the computer to:
receive a source code comprising at least one line of executable code at a syntax checker in response to detecting an execution control from an application interface;
operate a parser to identify potential problems in the source code as configured by the syntax checker, wherein the potential problems in the source code include at least one of presence of characters, absence of characters,
presence of a symbol, absence of a symbol and combinations thereof;
assemble a structured problem list comprising identified potential problems sorted according to line number position of each of the identified potential problems in the source code through operation of a constructor;
operate an interpreter to:
execute the source code and detect an execution failure; identify execution errors responsible for the execution failure;
match the execution errors to the identified potential problems in the structured problem list through control of a comparator;
generate an error report for the execution failure comprising the identified potential problems, the execution errors, and the line number position for the identified potential problems within the source code; and
apply a tag to the source code for the line number position of the identified potential problems; operate a translation system to:
configure a selector with the execution errors to retrieve an error message descriptor from an error message allocation of memory in a controlled memory data structure comprising error reports from one or more source codes by:

identify common errors from the error reports in the error message allocation of memory within the controlled memory data structure, each of the common errors associated with one or more resultant errors and a specific error message descriptor;

determine each of the execution errors to be one of the common errors or one of the one or more resultant errors;

select one of the common errors associated with each one of the one or more resultant errors determined for the execution errors; and generate the error message descriptor from the specific error message descriptor of each of the common errors determined or selected for the execution errors;

generate an error message comprising the error message descriptor with the identified potential problems and the line number position through control of an error message constructor; and send an error file to a device to display the error message with the source code through a graphical user interface and render a visual indicator at the line number position with the tag; and store the error report in an error report allocation of memory within the controlled memory data structure;

parse a raw interpreter error for the execution failure to identify the execution errors.

8. The computer-readable storage medium of claim 7, wherein the instructions further configure the computer to:
record a correct variable name to be used, if the execution errors is identified as a "ReferenceError";
record a correct special character, if the execution errors is identified as an "UnexpectedToken"; and
record a reported function to be used, if the execution errors is identified as "this is not a function".

9. The computer-readable storage medium of claim 8, wherein the instructions further configure the computer to:
record a specified line number position from the raw interpreter error, if the comparator fails to match the execution errors to the identified potential problems.

10. The computer-readable storage medium of claim 9, wherein the instructions further configure the computer to:
match a first line number position in the structured problem list to the execution errors, if the specified line number position is not present in the raw interpreter error.

11. The computer-readable storage medium of claim 8, wherein the instructions further configure the computer to:
match a last line number position in the structured problem list to the execution errors, if the execution errors is identified as an "Unexpected end of input".

12. The computer-readable storage medium of claim 8, wherein the instructions further configure the computer to:
match a last identified potential problem to the execution errors, if two or more of the identified potential problems have a same line number position.

13. A computing apparatus, the computing apparatus comprising:
a processor; and
a memory storing instructions that, when executed by the processor, configure the apparatus to:
receive a source code comprising at least one line of executable code at a syntax checker in response to detecting an execution control from an application interface;
operate a parser to identify potential problems in the source code as configured by the syntax checker, wherein the potential problems in the source code include at least one of presence of characters, absence of
characters, presence of a symbol, absence of a symbol, and combinations thereof;
assemble a structured problem list comprising identified potential problems sorted according to line number position of each of the identified potential problems in the source code through operation of a constructor;
operate an interpreter to:
execute the source code and detect an execution failure;
identify execution errors responsible for the execution failure;
match the execution errors to the identified potential problems in the structured problem list through control of a comparator;
generate an error report for the execution failure comprising the identified potential problems, the execution errors, and the line number position for the identified potential problems within the source code; and
apply a tag to the source code for the line number position of the identified potential problems;
operate a translation system to:
configure a selector with the execution errors to retrieve an error message descriptor from an error message allocation of memory in a controlled memory data structure comprising error reports from one or more source codes by:
identify common errors from the error reports in the error message allocation of memory within the controlled memory data structure, each of the common errors associated with one or more resultant errors and a specific error message descriptor;
determine each of the execution errors to be one of the common errors or one of the one or more resultant errors;
select one of the common errors associated with each one of the one or more resultant errors determined for the execution errors; and
generate the error message descriptor from the specific error message descriptor of each of the common errors determined or selected for the execution errors;
generate an error message comprising the error message descriptor with the identified potential problems and the line number position through control of an error message constructor; and
send an error file to a device to display the error message with the source code through a graphical user interface and render a visual indicator at the line number position with the tag; and
store the error report in an error report allocation of memory within the controlled memory data structure;
parse a raw interpreter error for the execution failure to identify the execution errors.

14. The computing apparatus of claim 13, wherein the instructions further configure the apparatus to:
record a correct variable name to be used, if the execution errors is identified as a "ReferenceError";
record a correct special character, if the execution errors is identified as an "UnexpectedToken"; and
record a reported function to be used, if the execution errors is identified as "this is not a function".

15. The computing apparatus of claim 14, wherein the instructions further configure the apparatus to:
record a specified line number position from the raw interpreter error, if the comparator fails to match the execution errors to the identified potential problems.

16. The computing apparatus of claim 15, wherein the instructions further configure the apparatus to:

match a first line number position in the structured problem list to the execution errors, if the specified line number position is not present in the raw interpreter error.

17. The computing apparatus of claim 14, wherein the instructions further configure the apparatus to:

match a last line number position in the structured problem list to the execution errors, if the execution errors is identified as an "Unexpected end of input".

18. The computing apparatus of claim 14, wherein the instructions further configure the apparatus to:

match a last identified potential problem to the execution errors, if two or more of the identified potential problems have a same line number position.

\* \* \* \* \*